US008527563B2

(12) United States Patent
Brugiolo

(10) Patent No.: US 8,527,563 B2
(45) Date of Patent: Sep. 3, 2013

(54) REMOTING REDIRECTION LAYER FOR GRAPHICS DEVICE INTERFACE

(75) Inventor: Ivan Brugiolo, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 139 days.

(21) Appl. No.: 11/300,086

(22) Filed: Dec. 14, 2005

(65) Prior Publication Data
US 2007/0079244 A1 Apr. 5, 2007

Related U.S. Application Data

(60) Provisional application No. 60/716,208, filed on Sep. 12, 2005.

(51) Int. Cl.
*G06F 12/00* (2006.01)
*G06F 15/16* (2006.01)
*G06F 17/30* (2006.01)

(52) U.S. Cl.
USPC .......................................... 707/899; 715/211

(58) Field of Classification Search
USPC ................................ 707/610, 899; 715/211
See application file for complete search history.

(56) References Cited

U.S. PATENT DOCUMENTS

| 5,652,749 | A | 7/1997 | Davenport et al. |
| 5,657,390 | A | 8/1997 | Elgamal et al. |
| 5,754,808 | A * | 5/1998 | Tanaka et al. ............... 715/763 |
| 5,842,040 | A | 11/1998 | Hughes et al. |
| 5,862,383 | A | 1/1999 | Laitinen |
| 6,038,232 | A | 3/2000 | Jung et al. |
| 6,081,265 | A | 6/2000 | Nakayama et al. |
| 6,329,984 | B1 * | 12/2001 | Boss et al. ................... 715/723 |
| 6,411,301 | B1 | 6/2002 | Parikh et al. |
| 6,421,058 | B2 | 7/2002 | Parikh et al. |
| 6,421,738 | B1 | 7/2002 | Ratan et al. |
| 6,424,348 | B2 | 7/2002 | Parikh et al. |
| 6,434,578 | B1 | 8/2002 | McCauley et al. |
| 6,452,600 | B1 | 9/2002 | Parikh et al. |

(Continued)

FOREIGN PATENT DOCUMENTS

| EP | 1320240 A | 6/2003 |
| JP | 05346842 A | 12/1993 |

(Continued)

OTHER PUBLICATIONS

"International Search Report", Mailed Date Sep. 12, 2005, Application No. PCT/US2009/031707*, Filed Date Aug. 15, 2006, pp. 4.
Chinese $1^{st}$ Office Action in Application 200680033355.4, mailed Jun. 5, 2009, 10 pgs.

(Continued)

*Primary Examiner* — Hosain Alam
*Assistant Examiner* — Van Oberly
(74) *Attorney, Agent, or Firm* — Merchant & Gould P.C.

(57) ABSTRACT

Remoting a display. A method that may be practiced, for example, in a networked computing environment including a local computer system running one or more applications and a remote computer that displays graphical information to a user for the one or more applications at the local computer system. The remote computer includes a number of surfaces. Drawing information including drawing commands is sent to the remote computer. Meta information is sent to the remote computer defining information about which surface from among the number of surfaces the drawing information applies. Composition information is sent to the remote computer defining the display characteristics of the surface.

17 Claims, 2 Drawing Sheets

(56) References Cited

U.S. PATENT DOCUMENTS

| | | |
|---|---|---|
| 6,466,218 B2 | 10/2002 | Parikh et al. |
| 6,538,656 B1 | 3/2003 | Cheung et al. |
| 6,615,382 B1 | 9/2003 | Kang et al. |
| 6,697,074 B2 | 2/2004 | Parikh et al. |
| 6,798,418 B1 | 9/2004 | Sartori et al. |
| 6,867,781 B1 | 3/2005 | Van Hook et al. |
| 6,957,769 B2 | 10/2005 | Hepworth et al. |
| 7,002,591 B1 | 2/2006 | Leather et al. |
| 7,075,538 B2 | 7/2006 | Peacock |
| 7,191,233 B2 | 3/2007 | Miller |
| 7,196,710 B1 | 3/2007 | Fouladi et al. |
| 7,200,809 B1 | 4/2007 | Paul et al. |
| 7,216,288 B2 | 5/2007 | Westerink et al. |
| 7,274,368 B1 | 9/2007 | Keslin |
| 7,278,097 B1 * | 10/2007 | Tanizaki et al. ............... 715/205 |
| 7,434,166 B2 | 10/2008 | Acharya et al. |
| 7,609,280 B2 | 10/2009 | Subramanian et al. |
| 7,852,342 B2 | 12/2010 | Leichtling et al. |
| 2002/0057275 A1 * | 5/2002 | Parikh et al. .................. 345/522 |
| 2002/0058499 A1 | 5/2002 | Ortiz |
| 2002/0103935 A1 | 8/2002 | Fishman et al. |
| 2002/0158865 A1 * | 10/2002 | Dye et al. ...................... 345/419 |
| 2003/0017846 A1 | 1/2003 | Estevez et al. |
| 2003/0030634 A1 * | 2/2003 | Sang'udi et al. .............. 345/418 |
| 2003/0033560 A1 | 2/2003 | Dassow et al. |
| 2003/0076328 A1 | 4/2003 | Beda et al. |
| 2003/0076329 A1 | 4/2003 | Beda et al. |
| 2003/0222883 A1 | 12/2003 | Deniau et al. |
| 2004/0015893 A1 * | 1/2004 | Banavar et al. ............... 717/138 |
| 2004/0081202 A1 | 4/2004 | Minami et al. |
| 2004/0123109 A1 | 6/2004 | Choi |
| 2004/0177373 A1 | 9/2004 | Kawabe et al. |
| 2004/0199574 A1 | 10/2004 | Franco et al. |
| 2005/0114771 A1 * | 5/2005 | Piehler et al. ................. 715/536 |
| 2005/0123267 A1 | 6/2005 | Tsumagari et al. |
| 2005/0132168 A1 * | 6/2005 | Weiss et al. ................... 712/203 |
| 2005/0132385 A1 | 6/2005 | Bourges-Sevenier |
| 2005/0163493 A1 | 7/2005 | Kobayashi et al. |
| 2005/0182791 A1 | 8/2005 | Lim et al. |
| 2006/0053215 A1 * | 3/2006 | Sharma ......................... 709/223 |
| 2006/0080382 A1 | 4/2006 | Dutta et al. |

FOREIGN PATENT DOCUMENTS

| | | |
|---|---|---|
| JP | 2004-501445 | 1/2004 |
| JP | 2005-151147 | 6/2005 |
| JP | 2005151147 | 6/2005 |
| JP | 2005151147 A | 6/2005 |
| JP | 2006-506025 | 2/2006 |
| KR | 100320973 B1 | 3/2002 |
| WO | WO 01/22238 | 3/2001 |
| WO | 2005029369 A2 | 3/2005 |
| WO | WO2005/029369 | 3/2005 |

OTHER PUBLICATIONS

Chinese Notice of Allowance in Application 200680033355.4, mailed Mar. 25, 2010, 4 pgs.
Extended European Search Report in Application 06801460.4, mailed Dec. 5, 2008, 8 pgs.
European Office Action in Application 06801460.4, mailed Mar. 12, 2009, 8 pgs.
Japanese Notice of Rejection in Application 2008531110, mailed Sep. 16, 2011, 4 pgs.
Japanese Notice of Allowance in Application 2008531110, mailed Mar. 29, 2012, 6 pgs.
U.S. Appl. No. 10/965,701, Office Action mailed Aug. 8, 2008, 12 pgs.
U.S. Appl. No. 10/965,701, Amendment and Response filed Dec. 8, 2008, 31 pgs.
U.S. Appl. No. 10/965,701, Office Action mailed Jan. 29, 2009, 21 pgs.
U.S. Appl. No. 10/965,701, Amendment and Response filed Apr. 29, 2009, 27 pgs.
U.S. Appl. No. 10/965,701, Office Action mailed Jun. 8, 2009, 19 pgs.
U.S. Appl. No. 10/965,701, Amendment and Response filed Jul. 14, 2009, 21 pgs.
U.S. Appl. No. 10/965,701, Office Action mailed Oct. 5, 2009, 9 pgs.
U.S. Appl. No. 10/965,701, Amendment and Response filed Jan. 5, 2010, 7 pgs.
U.S. Appl. No. 10/965,701, Notice of Allowance mailed Jan. 27, 2010, 4 pgs.
U.S. Appl. No. 10/965,701, Notice of Allowance mailed Nov. 3, 2010, 4 pgs.
U.S. Appl. No. 11/279,194, Office Action mailed Nov. 14, 2007, 10 pgs.
U.S. Appl. No. 11/279,194, Amendment and Response filed May 14, 2008, 14 pgs.
U.S. Appl. No. 11/279,194, Office Action mailed Aug. 28, 2008, 9 pgs.
U.S. Appl. No. 11/279,194, Amendment and Response filed Nov. 17, 2008, 23 pgs.
U.S. Appl. No. 11/279,194, Amendment and Response filed May 5, 2009, 24 pgs.
U.S. Appl. No. 11/279,194, Notice of Allowance mailed Aug. 14, 2009, 8 pgs.
Editor: Adrian Nye, "X Protocol Reference Manual", for X11, Release 6, Jan. 1995, O'Reilly & Associates, Inc., 38 pages.
Korean Notice of Allowance in KR Application 10-2008-7006061, mailed Jun. 14, 2013, 2 pgs. (no English translation).

* cited by examiner

REMOTING REDIRECTION LAYER FOR GRAPHICS DEVICE INTERFACE

CROSS-REFERENCE TO RELATED APPLICATIONS

This application claims the benefit of U.S. Provisional Application No. 60/716,208, titled "Remoting of the Redirection Layer for Graphics Device Interface," filed on Sep. 12, 2005, which is incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc. The functionality of computers has also been enhanced by their ability to be interconnected through various network connections. Computer networks may allow for resources and services to be available on a network. Such resources and services may be, for example and not limited to, file servers for storing data accessible by the clients, print servers for providing access to printers to the clients, and shared stores on client computers for storing data to be made available to other clients and resources on the network.

One example of the functionality provided by networked computers relates to the ability to provide terminal services from a server computer. The types of services may also be referred to as an application server. A terminal services (TS) server may provide computing functionality to one or more TS clients. In this example, TS clients connect to a TS server where the TS server is able to provide computing power for executing applications and performing other computing functions requested at the TS clients. In this fashion, the processing power of a TS server can be leveraged such that several TS clients can utilize the processing power of the TS server. A powerful TS server can provide computing functionality to 100s of clients simultaneously.

Applications at a TS server send display information to the TS client which can be displayed to a user at the display at the TS client. Typically, this has been performed by sending a single stream of drawing commands indented for a desktop as a whole from an application from the TS server to the TS client. The information sent from the TS server to the TS client for rendering graphics on the display at the TS client is typically used in an immediate presentation mode where tiled windows results in loss of graphic information. For example, using immediate presentation mode, only the information needed to draw the visible portions of windows is available. In other words, there is no graphics information for portions of windows in the background covered by other windows. Graphics information is only retained for top level windows. When an application sends information for drawing graphics, the information is sent for a particular part of the screen. If other windows already occupy that part of the screen, the portions of the windows that already occupy that part of the screen will be drawn over when the application sends the drawing command. When a window is moved to the foreground, new information is needed to draw the window in the foreground. This may present various difficulties when windows are displayed with spacing in between them or when windows are shuffled, rotated, and rearranged. This may also present various challenges as it relates to animations.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein includes a method that may be practiced, for example, in a networked computing environment including a local computer system running one or more applications and a remote computer system that displays graphical information to a user for the one or more applications at the local computer system. The remote computer system includes a number of surfaces. The method includes sending drawing information including drawing commands to the remote computer. The method further includes sending meta information to the remote computer defining information about which surface from among the number of surfaces the drawing information applies. Composition information is sent to the remote computer defining the display characteristics of the surface.

Another embodiment practiced in a similar environment from a client perspective includes a method including receiving drawing information including drawing commands from the local computer. The method further includes receiving meta information defining information about which surface from among the number of surfaces the drawing information applies from the local computer. Composition information is received from the local computer defining the display characteristics of the surface.

Another embodiment described herein is directed to a remote computer system. The computer system may be implemented, for example, in a networked computing environment including a local computer system running one or more applications and wherein the remote computer displays graphical information to a user for the one or more applications at the local computer system. The remote computer system includes a client. The client is configured to render graphical components on a user interface at the remote computer system. The remote computer system further includes a surface manager. The surface manager includes information about graphics displayed on the user interface at the remote computer system. The computer system further includes a composition engine coupled to the surface manager. The composition engine corresponds to a composition engine at a local computer system. The composition engine is configured to receive composition information from the local computer and to modify a composition tree based on the composition information received from the local computer and information at the surface manager to provide graphical drawing instructions to the client.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
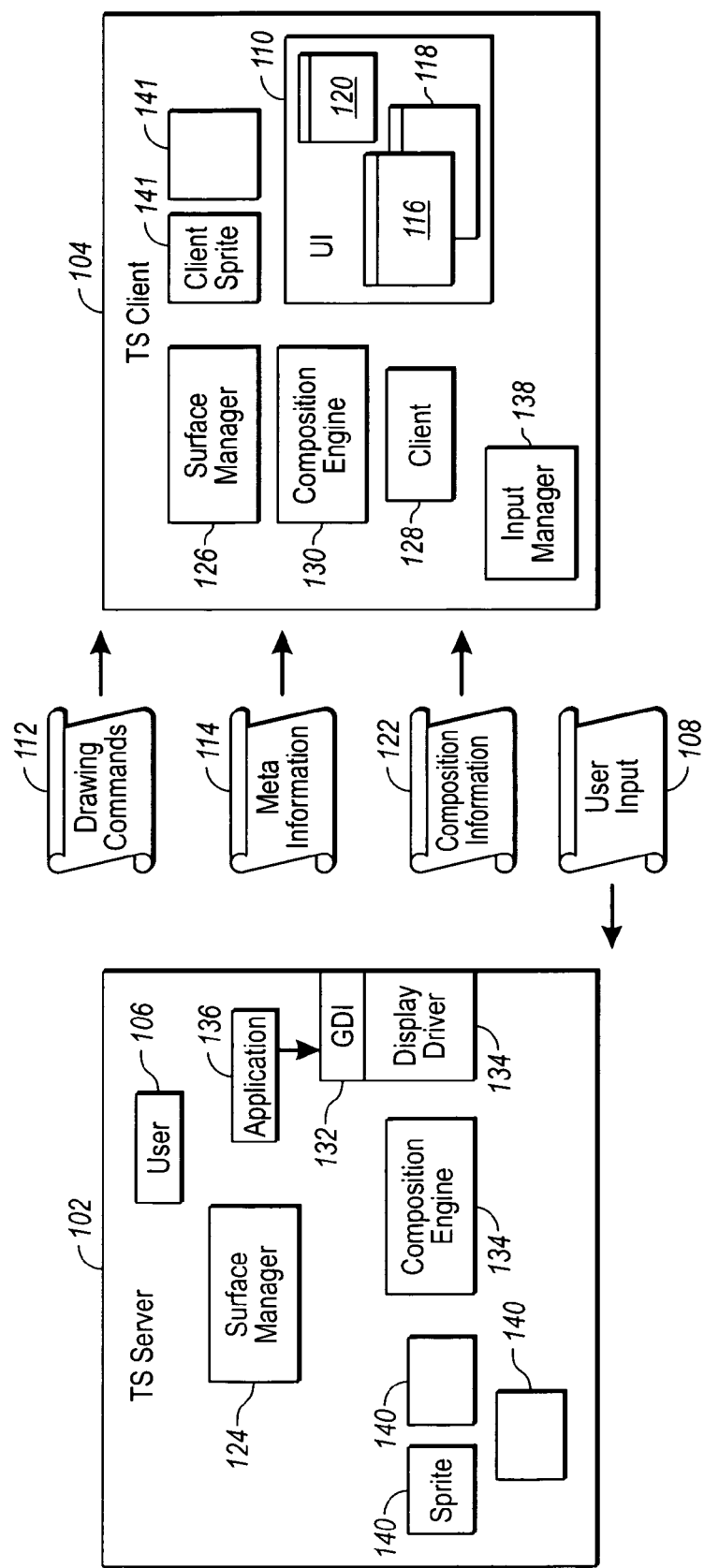
FIG. 1 illustrates a topology including a local computer system and a remote computer system to which graphics can be remoted.

Embodiments herein may comprise a special purpose or general-purpose computer including various computer hardware, as discussed in greater detail below.

As a preliminary matter, it will be appreciated and understood that the examples and descriptions herein make frequent reference to MICROSOFT WINDOWS terminology for purposes of convenience in one implementation. Such reference to specific terms, however, should not be construed as limiting implementations to specific operating systems. Rather, the elemental functionality described herein can be practice in any computing environment or operating system where functionality described herein is desired.

The scene viewed at the desktop of a computer is composed by overlapping top level UI abstraction, called windows, and other miscellaneous UI effects, such as cursors, drag rectangles, frames and borders (sprites).

When desktop composition is enabled, the final (or composed) scene is not necessarily limited to overlapping of windows and sprites. Rather, those individual entities are building blocks for animations, 3d-effects, shading, per-pixel color transformation, transparencies. To separate primitive drawing commands for windows and sprites from the composition of those to form the final scene, structural redirection has been introduced. Structural redirection consists at least in part of creating a backing surface for all top level entities, redirecting drawing commands onto the backing surface instead of targeting the desktop as a whole. A new entity, called composition engine, is eventually responsible for composing a final representation of the visible scene after having applied all the effects and transformation.

One embodiment described herein allows for a desktop to be displayed remotely by using a composite desktop in retained mode. Composite desktop in retained mode implies that graphics information for each window displayed at a remote client is retained such that various relationships between windows can be changed and various animations accomplished without losing graphics information. Composite desktop displayed remotely uses a number of different data streams to split commands to allow for suitable interaction between user interface (UI) components. For example, composite desktop, in one embodiment, uses three data sets to render a display. One data set includes drawing commands. A second data set includes meta information, or structural redirection information defining a particular surface for which drawing commands are intended. A third data set includes composition or relationship information that defines how windows and sprites should be displayed individually and with respect to other windows and sprites.

Graphic drawing commands are targeted for each application to a specific surface and window that occupies the surface. Thus, one stream of information includes drawing commands such as Graphical Device Interface (GDI) drawing commands generated by an application. The drawing commands can be transmitted in a TS server to a display driver at the TS server. Encoded GDI commands known at the display driver can be transmitted to the TS client. In one embodiment, GDI commands can be targeted to an individual drawing surface at the TS server and the TS client by a stream of meta information. For example, the surface may be one associated with a current Distributed Computing Environment (DCE) Visual at the TS server.

The meta information includes information such as an indication of which surface a drawing command is intended for. The meta information stream of data is the structural redirection information used to correctly create TS client-side version of surfaces and sprites. The hierarchy of this information, in one exemplary embodiment, starts with the DCE Visual (Desktop Composition Engine Visual entity), or DWM Visual (Desktop Window Manager Visual entity). Each DCE Visual may have attached a drawing surface. This surface is not attached when the visual is hidden or not visible by occlusion or programmatic reason. Each DCE Visual may have different drawing surfaces attached during its lifetime (for example, this happens when a window is resized).

The drawing surface is logically the target of a primitive GDI draw command; and is comparable to the traditional SURFOBJ abstraction that is seen as a parameter in the display driver interface (DDI). In one example, DDI calls from the GDI to the display driver. The creation/destruction of DCE Visual and the attach/detach of a SURFOBJ is tracked using special notification code from a generic notification entry-point added to the display driver model. Once the display driver knows about the lifetime of DCE Visuals and the associated SURFOBJs, the display driver can encode that information in an extended remote desktop protocol (RDP), and this allows the TS client to re-create the same entities. The interface through which the composition engine accesses the redirection surfaces and the sprites is the same, in one embodiment, at the client and at the server, because the concept of retrieving a surface (previously drawn with GDI primitive commands) can be abstracted in the surface manager interfaces. The meta data may further include other surface information such as the size of the surface, the existence of the surface, the creation of a new surface, the destruction of a surface, and color depth of a surface (i.e., 8 bit color, 16 bit color, 32 bit color, etc.).

A composition manager uses composition information to arrange the graphics on the screen such that the user sees information that is presented by the composition manager, and not necessarily what an application has available for display. One exemplary implementation can therefore exploit applications that rely on the MIL remoting infrastructure (MIL is the Media Infrastructure Layer, a set of interfaces and components used to build user interfaces and applications) to receive MIL commands (that describes effects, transformation, and structural redirection information). MIL commands are generally designed to be transported over a generic transport, and are supplied, in one embodiment, unchanged to the composition engine. The composition engine does not typically have a provision to efficiently remote the GDI style drawing commands that targets the drawings surfaces and sprites. As such, it uses an external entity, such as one provided by a client at the TS client to supply the backing surfaces for those entities.

The MIL commands are one of the streams of data that are sent through the RDP display driver, and delivered unchanged to a generic entry point to the composition engine at the TS client.

The MIL commands may include information that defines window borders, window backgrounds, perspective of a window, order that a window appears on a display, button shapes and sizes in a window, animation information, cursor position, shading, light perspective and the like.

While the above description has made use of application specific terminology directed to Microsoft Windows specific examples, a more generic description that can be used in other environments is now described in FIG. 1. FIG. 1 illustrates a network environment 100 including a TS server 102 and a TS client 104. A user, such as a person or application, located at the TS client 104 may initiate a session at the TS server 102 as illustrated by the user 106 at the TS server 102. The user 106, as illustrated herein is an abstraction for a user session comparable to the NTUser in Microsoft remote server applications. In one embodiment, the user at the TS client 104 is establishing a session so as to have computing tasks, such as running applications, performed at the TS server 102 with the graphical results being displayed at the TS client 104. Thus, the example illustrated is one of an application server. Embodiments, however, may be used for other applications as well.

Generally, FIG. 1 illustrates user input 108 being sent from the TS client 104 to the TS server 102. The TS server 102 is shown as sending three distinct streams of data to the TS client 104 to convey display information for rendering graphics at the user interface (UI) 110. The TS server 102 sends drawing commands 112 that specify for an application what should be drawn on a surface. For example, the drawing commands may specify various lines, circles, rectangles, pixels and the like that should be drawn on a surface. The TS server 102 further sends meta information 114 which may specify a particular drawing surface, such as one of surfaces or sprites 141 for the windows 116, 118, and 120, where the drawing commands are executed. This may be accomplished by the surface manager 124 at the TS server 102 sending meta information to the surface manager 126 at the TS client 104.

Additionally, FIG. 1 illustrates the TS server 102 sending composition information 122. The composition information defines how surfaces should be displayed individually and with respect to other surfaces. For example, in one embodiment, a composition hierarchy may be used to indicate surface relationships with one another. Changes in the hierarchy may be sent as composition information 122.

Illustrating now a more detailed explanation of FIG. 1, in one embodiment, after a session is initiated, the TS server 102 at the user 106 may send a notification to the TS client 104 at the client 128 to change from non-composite mode to composite mode. The TS server 102 at the user 106 may further send a notification to the TS client 104 at the client 128 to change from non-retained mode to a retained mode for top level applications.

The client 128 may initialize the composition engine 130 at the TS client 104. The client 128 may further initialize the surface manager 126 at the TS client 104.

The user 106 in conjunction with the GDI 132 performs a layering process. The layering process includes detaching layers for each top level window. Each layer defines a sprite. The layers are attached to the appropriate top level window and each top level window is commanded to repaint. The layering process can be used to create the meta information about each sprite that is sent as meta information 114. For example, the layering process can be used to obtain the dimensions of each sprite and color depth.

At the TS server 102, A Graphical Device Interface, (GDI) 132 sits on top of a display driver 134. The GDI 132 receives drawing commands from an application 136 and meta information, including redirection events defining a sprite 140 to which the drawing commands should be directed. The GDI directs the display driver 134 to draw to a specific sprite 140. By using the display driver 134 drawing can be performed more efficiently by executing commands understood by the display driver. For example, a circle can be drawn by radius and color, lines can be drawn using a line operation function, etc.

The display driver 134 receives for each drawing operation a target and a command (such as draw a line, draw a circle, etc). The display driver 134 interfaces with the client 128 through an extended RDP protocol. The extended RDP protocol allows for sending a target and a drawing command. In particular the extended RDP protocol includes commands for targeting a specific sprite. The client 128 can then target the appropriate surface or sprite 141 associated with a window 116, 118 or 120 with a drawing command.

Implicit context information may exist. In one embodiment, some drawing commands may be sent without meta information defining the particular target. This may be performed for example, when a drawing command is intended for the same target as the immediately preceding drawing command. Thus, if a stream of drawing commands is intended for the same target, network bandwidth can be conserved by sending meta information 114 with a single target message and a number of drawing commands 112 associated with the target message.

The composition engines 134 and 130 then perform a composing process to appropriately render elements at the UI 110. The composing process includes the use of information about what to compose and how to compose. What to compose depends on the retained graphical information and the windows 116, 118, and 120 at the UI 110. How to compose often depends on user input. For example, user input will affect how windows are layered on one another, window size as a result of a resizing operation, animations such as those resulting from window maximizations and minimizations, cursor movements, text entry etc. For example, if a user chooses to move one window from the background to the foreground, an order change takes place in the composition hierarchy.

Illustrating now the process for using user input in a composition process, attention is directed to FIG. 1. FIG. 1 illustrates an input manager 138 at the TS client 104. The input manager 138 coordinates user input such as from keyboard entries, mouse movement, mouse button actuations, and the like. User input 108 is then sent to the TS server 102 and particularly to the user 106 where it can be processed as if the user input took place locally at the TS server 102. The portions of the user input that affect the coordination of windows is sent to a structural redirection layer of the composition engine 134 where it is then sent as composition information 122, such as by using a MIL command, to the TS client 104 where it can be delivered to the composition engine 130 where the composition information 122 can be used to appropriately render the windows 116, 118, 120 in the UI 110. For example, the composition engine 130 can correlate with the surface manager 126 to obtain the redirection surface or sprites 141 for all of the top level abstractions. The composition engine 130 can then display various elements and animations. As such the composition engine 130 can cause various display features such as window maximizing and minimizing, rotations, tiling, shuffling, etc. The composition information 112 may include any changes to a composition hierarchical tree.

The composition information may further include notices of graphical changes. As such, any window with graphical changes can be redrawn. The composition information may further include border transparency, border color, border texture (i.e. glass metal etc), button appearances, shading, light perspectives, object rotation information and the like.

Figure 2:
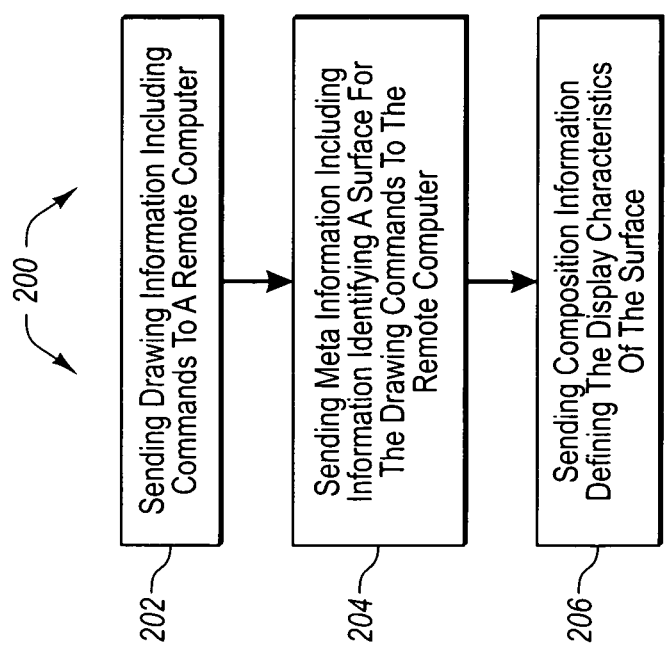
FIG. 2 illustrates an exemplary method for sending graphics information.

Referring now to FIG. 2, a method is illustrated. The method 200 may be practiced for example, in a networked computing environment including a local computer system running one or more applications and a remote computer that displays graphical information to a user for the one or more applications at the local computer system. The remote computer may include a number of surfaces at a user interface.

The method includes an act of sending drawing information including drawing commands to the remote computer (act 202). For example, as illustrated in FIG. 1, drawing commands 112 may be sent from a TS server 102 to a TS client 104.

Referring once again to FIG. 2, the method 200 further includes sending meta information to the remote computer defining information about which surface from among the number of surfaces the drawing information applies (act 202). For example, and referring again to FIG. 1, the TS server 102 may send meta information 114 to the TS client 104. In some embodiments, the meta information includes information directed to at least one of size of a surface, color depth of a surface, creation of a surface, destruction of a surface, and/or resizing of a surface.

The method 200, as illustrated at FIG. 2, further includes an act of sending composition information to the remote computer defining the display characteristics of the surface (act 206). For example, and as illustrated in FIG. 1, the TS server 102 may send composition information 122 to the TS client 104. The composition information may include for example information defining surface features. The surface features may include for example at least one of frame color, frame texture, shading of elements, rotation, maximization of a window, and/or minimization of a window. Embodiments may be such that the composition information includes composition tree information defining surface relationships to one another. For example, the composition information may include information that specifies that a window should be brought from the background to the foreground, thus changing an ordering in a composition tree.

The method 200 may further include sending a command to the remote computer to turn on composite desktop. For example, if the remote computer initiates in a non-composite desktop mode, the local computer may send a command to the remote computer indicating that the mode should be changed to composite desktop mode to maximize the usability of the drawing commands, the meta information, and the composition information. Similarly, the method 200 may include sending a command to the remote computer to turn on retained mode.

As described in examples previously herein, the method 200 may include receiving user input from the remote computer. As such, sending composition information includes sending information related to the user inputs. For example, if a user at a TS client 104 provides user input to effect how windows 116, 118, and 120 are displayed, such as by minimizing, maximizing, resizing, etc, that user input can be provided to the TS server 102. The TS server 102 can then provide appropriate composition information 122 to that can be used at the composition engine 130 to affect how the client 128 renders graphics at the UI 110.

Embodiment described herein further contemplate sending additional drawing commands without sending accompanying meta information for the additional drawing commands identifying a target. This may be performed when the target can be inferred from other drawing commands associated with meta information identifying a target for the other drawing commands. For example, if a stream of drawing commands 112 are intended for a particular target, for example the surface for the window 120, then the entire stream of drawing commands may be directed to the surface for the window 120 by using a single target command sent as meta information 114 for the entire stream. For example, in one embodiment, meta information may be sent identifying a particular target. Any subsequent drawing commands may be applied to the particular target. When new meta information is sent identifying a different target, any subsequent drawing commands will be applied to the different target.

Embodiments may be included where the acts of sending drawing information, sending meta information, and sending composition information comprise sending to a display driver at the local computer. For example, the drawing information, meta information, and composition information may be sent to a display driver 134 where the information can then be sent to a local TS client 104. As described previously, the TS server 102 may be able to host applications for a number of TS clients 104. The TS server 104 may therefore include a user 106, surface manager 124, GDI 132, composition engine 134 and display driver 134 for each TS client 104 coupled to the TS server 102.

The method 200 may further perform a layering process to create the meta information. The layering process may include detaching layers for top level windows and commanding top level windows to repaint.

Figure 3:
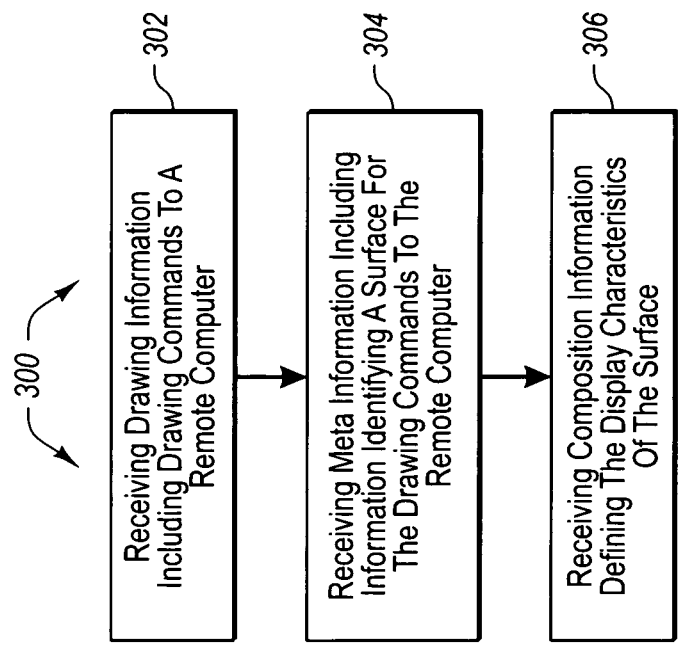
FIG. 3 illustrates and exemplary method for receiving and using graphics information.

Referring now to FIG. 3, another method of displaying information at a remote computer is illustrated. The method 300 may be practiced in a networked computing environment including a local computer system running one or more applications and a remote computer that displays graphical information to a user for the one or more applications at the local computer system. The remote computer including a number of surfaces at a user interface. The method includes receiving drawing information including drawing commands from the local computer (act 302). For example, as illustrated in FIG. 1, the TS client 104 may receive drawing commands 112 from the TS server 102.

The method 300 further includes an act of receiving meta information defining information about which surface from among the number of surfaces the drawing information applies from the local computer (act 304). For example, the TS client 104 receives meta information 114 from the TS server 102. At the TS client 104, drawing commands 112 can be applied to a target specified in the meta information 114. For example, the meta information may specify a surface corresponding to the window 120. The drawing commands would then be applied to that surface.

The method 300 further includes receiving composition information from the local computer defining the display characteristics of the surface (act 306). For example, the TS client 104 receives composition information 122 from the TS server 102.

The method 300 may further include referencing a surface manager to determine a user interface layout. For example, the surface manager 126 may be referenced to determine the layout of graphics at the UI 110. The method 300 may further include applying the composition information at a composition manager with respect to the user interface layout defined at the surface manager. For example, the composition engine 130 may take into account composition information 122 as well as layout information at the surface manager 126 when providing the client 128 with information needed to render graphics at the UI 110.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a networked computing environment including a local computer system running one or more applications and a remote computer system that displays graphical information for the one or more applications at the local computer system, the remote computer system including a plurality of surfaces, a method of transferring display information, the method comprising:
    sending a command from the local computer system to the remote computer system to retain drawing information and meta information on the remote computer system;
    sending drawing information to the remote computer system, wherein the drawing information includes drawing commands for displaying graphical information on the remote computer system associated with the one or more applications, wherein the one or more applications are associated with a window of a plurality of windows on the remote computer system;
    sending meta information to the remote computer system identifying a surface from among the plurality of surfaces to which the drawing information applies, wherein the window is associated with the surface;
    sending first composition information to the remote computer system defining display characteristics of the surface, wherein the first composition information comprises first composition tree information identifying a hierarchical relationship between the surface and the plurality of surfaces, and wherein the first composition tree information indicates that the window should be displayed in a background on the remote computer system; and
    sending second composition information to the remote computer system, wherein the second composition information comprises second composition tree information identifying a changed hierarchical relationship between the surface and the plurality of surfaces, and wherein the second composition tree information indicates that the window should be displayed in a foreground on the remote computer system based on the retained drawing information and the retained meta information.

2. The method of claim 1, wherein the first composition information includes information defining surface features.

3. The method of claim 1, wherein the surface features include at least one of frame color, frame texture, shading of elements, rotation, maximization of the window, and/or minimization of the window.

4. The method of claim 1, wherein the meta information includes information directed to at least one of: size of the surface, color depth of the surface, creation of the surface, destruction of the surface, and resizing of the surface.

5. The method of claim 1, further comprising receiving user input from the remote computer and wherein sending the second composition information comprises sending information related to the user inputs.

6. The method of claim 1, further comprising sending second drawing commands without sending accompanying second meta information for the second drawing commands when a surface can be inferred from first drawing commands associated with first meta information identifying the surface for the first drawing commands.

7. The method of claim 1, wherein the acts of sending drawing information, sending meta information, and sending first composition information comprise sending to a display driver at the local computer.

8. The method of claim 1, further comprising performing a layering process to create the meta information, the layering process comprising detaching layers for top level windows and commanding top level windows to repaint.

9. The method of claim 1, wherein the local computer is a TS server.

10. The method of claim 1, wherein the meta information further comprises information that defines drawing commands for each surface.

11. The method of claim 1, further comprising:
    sending light perspective data from the local computer system to the remote computer system.

12. In a networked computing environment including a local computer system running one or more applications and a remote computer system that displays graphical information for the one or more applications at the local computer system, the remote computer system including a plurality of surfaces, a method of displaying information at the remote computer system, the method comprising:

receiving a command from the local computer system to retain drawing information and meta information;

receiving drawing information including drawing commands from the local computer system, wherein the drawing information includes drawing commands for displaying graphical information on the remote computer system associated with the one or more applications, wherein the one or more applications are associated with a window of a plurality of windows on the remote computer system;

receiving meta information from the local computer system identifying a surface from among the plurality of surfaces to which the drawing information applies wherein the window is associated with the surface;

receiving first composition information from the local computer system defining display characteristics of the surface, wherein the first composition information comprises first composition tree information identifying a hierarchical relationship between the surface and the plurality of surfaces, and wherein the first composition tree information indicates that the window should be displayed in a background on the remote computer system; and receiving second composition information from the local computer system, wherein the second composition information comprises second composition tree information identifying a changed hierarchical relationship between the surface and the plurality of surfaces, and wherein the second composition tree information indicates that the window should be displayed in a foreground on the remote computer system using the retained drawing information and the retained meta information.

13. The method of claim 12, further comprising referencing a surface manager to determine a user interface layout, and applying the first composition information at a composition manager with respect to the user interface layout defined at the surface manager.

14. The method of claim 12, further comprising applying the drawing commands to the surface specified in the meta information.

15. The method of claim 14, further comprising:

receiving second drawing commands without receiving accompanying second meta information for the second drawing commands when a surface can be inferred from first drawing commands associated with first meta information identifying the surface for the first drawing commands; and applying the second drawing commands to the surface identified by the first meta information.

16. The method of claim 12, further comprising:

sending user input to the local computer system; and receiving the second composition information from the local computer system, wherein the second composition information is relevant to the user input.

17. The method of claim 12, wherein the remote computer is a TS client.

* * * * *